United States Patent [19]

Reimers

[11] 4,330,742
[45] May 18, 1982

[54] CIRCUITRY FOR RECOVERING ELECTRICAL ENERGY WITH AN ELECTRIC VEHICLE DC PROPULSION MOTOR WHEN BRAKING

[76] Inventor: Eberhart Reimers, 8807 Strause Ct., Springfield, Va. 22153

[21] Appl. No.: 139,613

[22] Filed: Apr. 11, 1980

[51] Int. Cl.³ .......................... H02J 7/00; H02P 3/10; H02P 3/14
[52] U.S. Cl. ..................................... 320/14; 318/139; 318/376; 320/61
[58] Field of Search ................... 320/14, 61; 318/376, 318/139

[56] References Cited
U.S. PATENT DOCUMENTS

3,546,548  12/1970  Wouk ............................. 318/376 X
3,947,744  3/1926  Grace et al. ......................... 320/61
4,124,812  11/1978  Naito et al. ...................... 318/376 X Primary Examiner—Robert J. Hickey
Attorney, Agent, or Firm—Nathan Edelberg; Robert P. Gibson

[57] ABSTRACT

An electrical drive vehicle with an onboard battery and a D.C. propulsion motor having means for automatically switching the D.C. motor from a series field operation to shunt field operation upon the operator actuating the braking means to convert the kinetic braking energy to electrically energy for charging, via an intermediate storage means, the onboard battery. The switching means is a variable duty cycle transistor switching means controlling the excitation of the D.C. motor in the shunt field mode.

4 Claims, 7 Drawing Figures

ALTERNATE CONFIGURATION CONTACTOR K3 AND K4

CIRCUITRY FOR RECOVERING ELECTRICAL ENERGY WITH AN ELECTRIC VEHICLE DC PROPULSION MOTOR WHEN BRAKING

The invention described herein may be manufactured, used and licensed by or for the Government for Governmental purposes without the payment to me of any royalties thereon.

BACKGROUND OF THE INVENTION

The invention relates to electric vehicles; and more particularly, to circuitry for providing recovery of electrical energy in an electric vehicle when braking.

Electric vehicles are, of course, old and well known. For many years, delivery vehicles used in cities were electric vehicles. In the late 1930's to more recent times, the electric vehicle gave way to the internal combustion engine driven vehicle. One major reason why electric vehicles were abandoned in favor of internal combustion engined vehicles was the limited range of electric vehicles between battery recharging. In addition, gasoline and diesel fuels were plentiful and inexpensive.

Due to the recent oil shortage and the increased price of crude oil, the interest in electric vehicles has been renewed. However, even the modern day electric vehicles can only provide a limited number of hours of operation before the batteries have to be recharged. These batteries are generally charged at the garage or maintenance facility. Some electric vehicles are provided with on-board chargers.

An example of the modern day electric vehicle with an on-board battery charger is the U.S. Post Office Urban Delivery electric vehicle which is a modified Jeep. The electric vehicle propulsion system of the postal vehicle utilizes a separate propulsion and on-board charging means for the battery. With separate on-board charging means for energy recuperation, there is a practical trade-off between weight of the charging means and energy recuperation which severely limits the on board energy recuperation in these Post Office electric vehicles. Thus, the drive range of these electrical vehicles between base recharges is primarily governed by the capacity of the batteries, and the drive range extension provided by the on board recuperation means is minimal.

This invention provides a means for recovering energy in electric vehicles when braking and utilizes the recovered energy for rejuvination purpose without significant overall weight increase. Without a limiting tradeoff to consider it will be appreciated that the circuitry of this invention extends the drive range between recharges of the batteries of an electric vehicle.

SUMMARY OF THE INVENTION

Circuitry for recovering electric energy is an electric vehicle when braking is disclosed. Two basic embodiments with several variations of each of the basic embodiments are disclosed. In accordance with the first basic embodiment of the invention, an industrial DC motor utilized in electric vehicles is modified to provide electric energy recovery during braking. The modification includes the addition of a shunt field in the DC motor which operates primarily as a series field machine. The shunt field is electromagnetically coupled to the series field of the motor. In addition to the shunt field, unidirectional conduction devices (diodes) and contractors are added to the motor controller.

In the second basic embodiment of the invention, a two-phase sequentially switched DC motor controller is modified to provide electric energy recovery during braking. The modifications of the sequentially switched motor controller are similar to the modifications made to the industrial controller of the first embodiment in that a shunt field is provided with each of the two series field motors of this embodiment.

The circuitry of this invention does not eliminate the need to periodically recharge the batteries of the electric vehicle. However by vehicle weight reduction and by providing a means to recover electric energy in an electric vehicle propulsion system over the entire speed range, the circuitry of this invention materially increases the drive range of an electric vehicle between battery recharges.

BRIEF DESCRIPTION OF THE DRAWING

A full and complete understanding of the invention can be obtained from the following detailed description of the invention when read in conjunction with the annexed drawing in which

FIG. 2b illustrates a variation of the component configuration in the circuitry of FIG. 2a.

FIG. 3 is a schematic diagram illustrating still another variation of the circuitry of the embodiment of FIG. 2a;

DETAILED DESCRIPTION OF THE INVENTION

Figure 1:
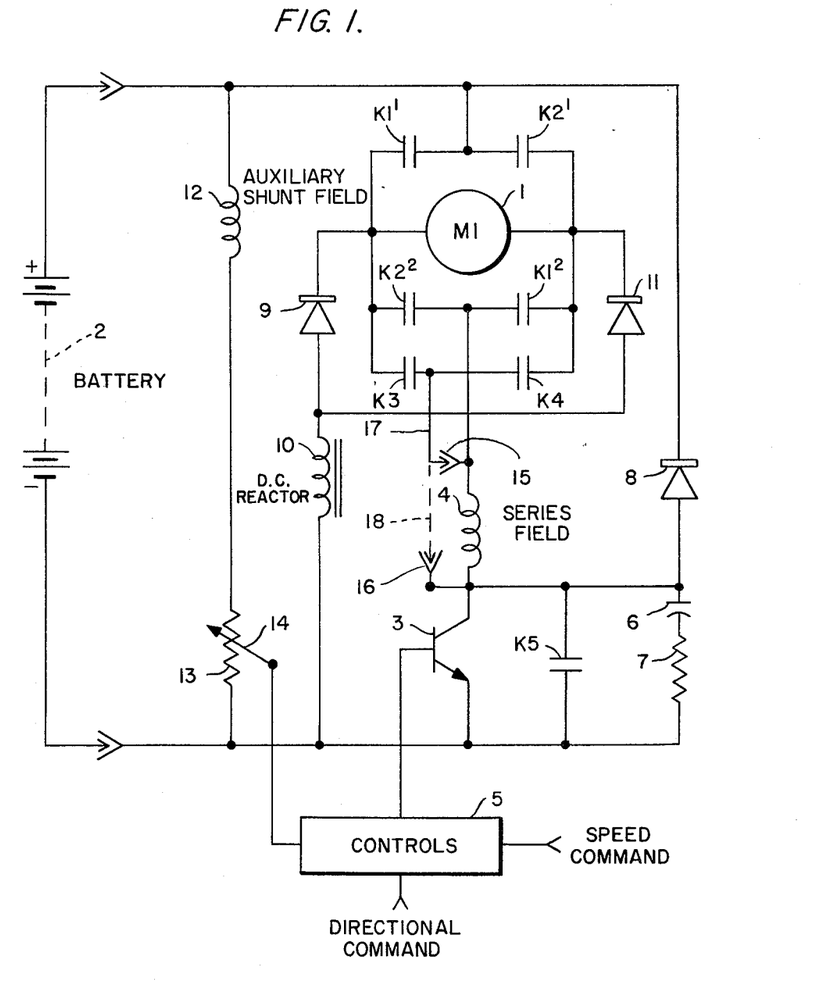
FIG. 1 is a schematic diagram illustrating the first basic embodiment of the invention.

FIG. 1 shows an electric vehicle motor controller modified in accordance with this invention to provide electric energy recovery. The motor controller of FIG. 1 is an industrial motor controller of the type typically used on some electric vehicles. None of the details of the electric vehicle are shown since persons skilled in the art are fully aware of the fact that the motor 1 is coupled to the vehicle by any suitable known mechanical coupling to propel the vehicle and that the motor 1 is energized by the battery 2 which typically is a battery containing a large number of cells. The circuitry of FIG. 1 includes a transistor switch 3. The emitter of transistor switch 3 is coupled to the negative terminal of battery 2; the collector is coupled to one side of the series field 4 of motor 1; and the base is coupled to the block 5 labeled "controls." Block 5 represents the typical controls found in an electric vehicle and it is through this circuitry and control mechanism that the electric vehicle is operated by the driver. Since block 5 represents well known electrical vehicle apparatus, this apparatus is shown in block diagram form.

A first pair of contactors $K1^1$ and $K1^2$ are utilized when the electric vehicle is driven in the forward direction and a second pair of contactors $K2^1$ and $K2^2$ are utilized when the vehicle is driven in the reverse direction. The contactors K3 and K4 are utilized to provide electric energy recuperaion in the forward and reverse direction respectively. Contactor $K1^1$ is coupled between one side of motor 1 and the positive terminal of battery 2 and contactor K1² is coupled between the other side of motor 1 and the series field 4. Contactor K2² is coupled between the said one side of motor 1 and the series field 4 while contactor K2¹ is between the said other side of motor 1 and the positive terminal of battery 2. Contactor K3 is coupled between the said one side of motor 1 and either, as will become apparent later, the common point of collector of transistor switch 3 and series field 4 or to the end of series field 4 to which contactors K2² and K1² are coupled. Contactor K4 is coupled between the said other side of motor 1 and either, as will become apparent later, the common point of series field 4 and the collector of transistor switch 3 or the end of series field 4 to which contactors K2² and K1² are coupled.

A contactor K5 is coupled across the emitter and collector at transistor swtich 3 and the capacitor 6 and the resistor 7 in series, are coupled across the contactor K5. A diode 8 is coupled between the positive terminal of battery 2 and collector of transistor switch 3. A diode 9 is coupled between the said one side of motor 1 and one end of reactor 10. The other end of reactor 10 is coupled to the negative terminal of battery 2. The diode 11 is coupled between the said other side of motor 1 and the end of reactor 10 to which diode 9 is coupled. A shunt field 12 in series with the variable resistor 13 is coupled across battery 2. The variable arm 14 of resistor 13 is coupled to controls block 5.

FIG. 1, which represents the first basic embodiment of the invention, shows, as has been previously mentioned, a conventional industrial motor controller used in electric vehicles that has been modified in accordance with this invention. The basic electric vehicle motor controller includes motor 1, series field 4, transistor switch 3, controls block 5, contactor pairs K1¹ and K1², and K2¹ and K2², contactor K5, capacitor 6, resistor 7, and diode 9. Thus, the modification in accordance with this invention includes the addition of contactors K3 and K4, diodes 9 and 11, reactor 10, variable resistor 13 and shunt field 12.

The basic motor controller as described above is utilized to propel the vehicle in either the forward or reverse direction. When the vehicle is to be propelled in the forward direction, contactors K1¹ and K1² are both closed and transistor switch 3 is alternately turned on and off to control the flow of current from battery 2 to motor 1 and thus to control motor speed.

The left-hand side of the armature (as shown in FIG. 1) of motor 1 is coupled to the positive terminal of battery 2 while the right-hand side of the armature of motor 1 is coupled to series field 4. With contactors K1¹ and K1² closed, the current from battery 2 rises exponentially to a finite value in direct response to motor speed and the conduction duty cycle of transistor switch 3, whereby motor 1 drives the vehicle in the forward direction. During the "off" or non-conducting period of transistor switch 3 the stored energy in the inductance of series field 4 must be expended. Thus, current continues to flow in the same direction but exits field 4 through diode 9. In this way, the energy is expended via the local loop comprising motor 1 and series field 4. During vehicle propulsion, the instantaneous current demand from battery 2 is identical to the instantaneous current amplitude of the motor for the duration of the conduction period of transistor switch 3. Thus, battery 2 furnishes pulsating current to motor 1 to propel the vehicle in this case in the forward direction at all but full motor speed. At full speed contactor K5 is closed by pulsing transistor switch 3. At this point the battery provides continuous DC current. It will be appreciated that in the basic circuitry of the motor controller, of the variety as described, above the electromagnetic flux excitation provided by the shunt field 12 is not considered as a critical element. Therefore, it will be seen that the typical prior art industrial chopper does not provide means for energy recovery in a series field motor when braking and only provides energy recovery in the upper motor speed range, if at all, when using shunt field excitation.

As stated, the basic motor controller circuitry of FIG. 1 does not provide for any energy recovery in the case of the simple DC series field machine, and in the event of a shunt field motor only recuperation in the high speed mode. However, the modification of this circuitry as shown in FIG. 1 does provide energy recovery by virtue of electromagnetic flux excitation of the under compounded shunt field and the energy storage-expenditure principle employed in the series field in combination with diodes 9 or 11. Shunt field 12 which is electromagnetically coupled to series field 4 contributes typically 10 to 20% of the total field excitation. Motive power is provided for the forward operating mode when contactors K1¹ and K2² are closed (all other contactors open) and for the reverse operating mode when contactors K2¹ and K2² are closed (all other contactors open). In the forward or reverse drive mode, transistor switch 3 is alternately turned on and off and its conduction duty cycle is a measure of the voltage of motor 1. In the propulsion or drive mode, motor excitation is provided mainly by series field 4.

It is assumed that the vehicle is traveling in a forward direction and is either coasting or the brakes are being applied. Under these conditions contactor K3 is closed and all other contactors are open. In the coasting or braking mode, with contactors K1¹ and K1² and contactors K2¹ and K2² open and transistor switch 3 conducting, motor 1 becomes a voltage source which obtains mechanical energy from the wheels of the vehicle and converts this into electrical energy. Since contactor K3 is closed (all others open), this voltage source is coupled to either one of the two connections 15 or 16 shown in FIG. 1. Connection 15, which is shown by the solid line 17, connects contactor K3 to the top end of series field 4 with line 17 disconnected from 15. Connection 16 shown as the dotted line 18, continuation of solid line 17, connects contactor K3 to the bottom end of series field 4. In actual construction, only one of these connections 15 or 16 will be utilized.

If connection 16 is provided, the armature of motor 1 is directly connected to transistor switch 3 through contactor K3 and the motor function solely as a shunt field excited generator during the conduction internal of transistor switch 3. Conduction of transistor switch 3 causes current delivered by this generator to build up in auxiliary reactor 10 with current existing through diode 11. However, when transistor switch 3 is open (non-conducting), the electromagnetic energy stored in reactor 10 and the armature of motor 1 must be expended. During this off state of transistor switch 3, current continues to flow in the same direction but decreases in amplitude exponentially while exiting from reactor 10, and irrespective of any small current changes, reactor 10 as well as the armature of motor 1 represents a constant current source for a short interval. This constant current source reverses its voltage polarity at its terminals and increases in amplitude until diode 8 conducts.

When diode 8 conducts, the stored energy from both the reactor 10 and the motor 15 is returned to battery 2, which in turn accepts the charge in accordance to its condition of charge. A considerable time prior to the depletion of the stored energy in reactor 10 and motor 1, transistor switch 3 is again closed and the recuperative energy cycle is repeated until the time mechanical braking energy has been depleted and the vehicle is near stand still.

Since energy is recuperated as described above, via the local loop of diode 8 and is independent of the battery voltage, it follows that energy recovery is obtained over the entire speed range except when motor 1 is near stall. Recuperative energy braking is similarly obtained when the vehicle is propelled in the reverse direction. In this mode the circuit functions are in the same manner as described above for the forward mode of recuperative braking operation except that contactor K4 and diode 9 are substituted for contactor K3 and diode 11. The magnitude of recuperated brake energy is a controlled variable and is a function of the conduction duty cycle of transistor switch 3 and the magnetic flux excitation of the shunt field.

The foregoing operation was described with contactor K3 (forward mode), or contactor K4 (reverse mode) connected to the common point of series 4 and the collector of transistor switch 3, connection 16 for a solely shunt field motor operation. However, connection 15 which connects contactor K3 and contactor K4 to the top of series field 4, is the preferred connection since this connection provides a means for the regenerative increase of the magnetic flux excitation of motor 1 by virtue of the series field. In this operating mode the shunt field is used essentially only to provide energy recovery during braking at full motor speed, and as a controlled flash point for the series field to raise the flux level of the machine regeneratively. The basic operation of connection 15 is the same as the operation of connection 16 described above; however, with connection 15, when transistor switch 3 alternately turns on and off, additional energy is stored in series field 4. The current in series field 4 will rise instantly to the ampere turns capacity presented by shunt field 12. Then, the rate of rise of the current in series field 4 is subject only to the inductance of reactor 10 which now is reduced significantly in physical size in comparison with the shunt field motor connection mode. Any additional rise in current beyond this value is determined by the magnetic saturation characteristics of series field 4 and the value of reactor 10. The current in shunt field 12 decreases momentarily when the magnetic flux excitation in the motor rises regeneratively and since energy is stored in its field inductance, this excessive energy will be returned in the form of a transient to battery 2.

Figure 2A:
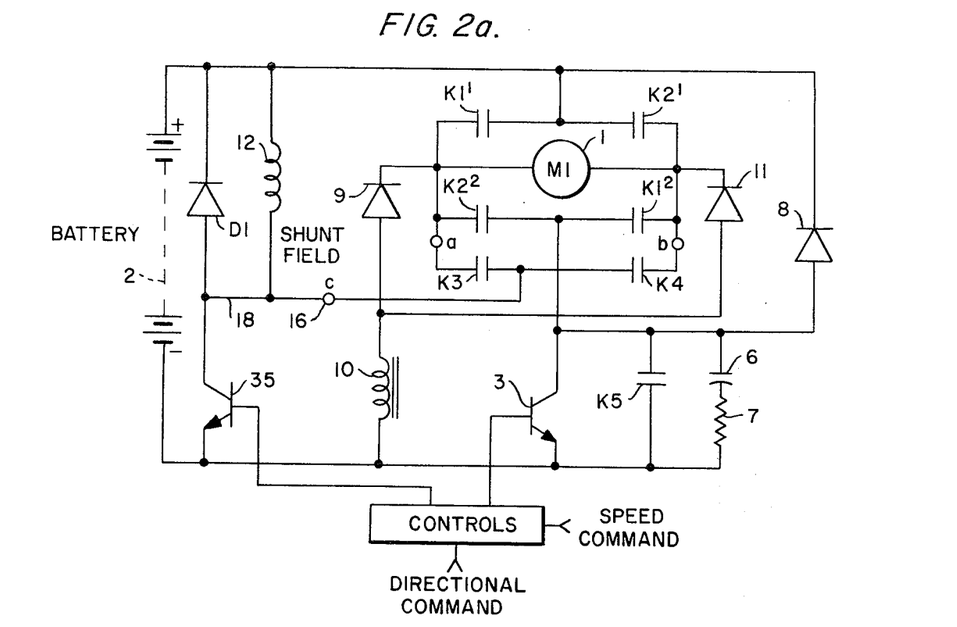
FIG. 2a is a schematic diagram illustrating a variation of the basic embodiment.

FIG. 2a shows an alternate interconnection method to facilitate recuperative energy braking with a shunt field motor. Variable resistor 13 is replaced with a transistor switch 35 which is alternately switched on and off at its base. In FIGS. 1 and 2a, like components have like numerals. In the propulsion operating mode, magnetic flux excitation of the machine is still a controlled variable. In lieu of an arbitrarily variable resistor, however, the flux excitation of shunt field 12 increases with the conduction duty cycle of transistor switch 35 and the initial control current in the shunt field increases in amplitude. When transistor switch 35 is conducting, the current amplitude in shunt field 12 rises exponentially. During the "off" interval of transistor switch 35, the energy stored in shunt field 12 is expended through diode D1 locally, and similarly as described for the preceding mode of the armature.

In the recuperative energy brake mode, contactor pairs K1 and K2 are open, and depending on the direction of the vehicle motion, only one of contactor pairs K3 or K4 is closed. Motor 1 is now in its generator mode and circulates energy via its local loop through the conducting transistor switch 35, reactor 10 and appropriate diode 11 or 9. As in FIG. 1, the stored energy in reactor 10 must be expended during the time transistor switch 35 is off or in the non-conduction mode. Stored energy in DC reactor 10 and armature of motor 1 is now expended and returned to the battery, with current flow in the same direction but exiting reactor 10 with decreasing amplitude through either one of the diodes 11 or 9, the armature winding of motor 1 and diode D1. It is interesting to note that this common armature and shunt field control method yields a generator characteristic which resembles that of a series field machine inasmuch as both armature current and shunt field current increase proportionally with the conduction duty cycle of transistor switch 3.

Figure 2B:
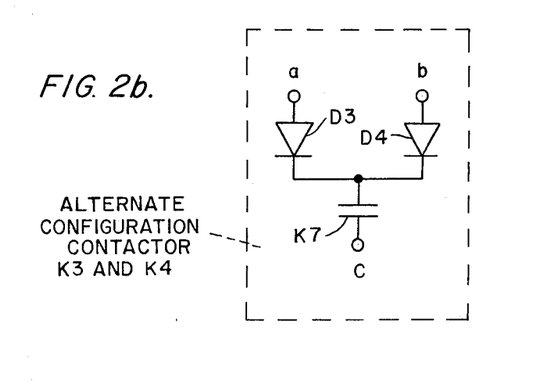

As shown in FIG. 2b, contactors or rotary switch K3 and K4 can be replaced by the diodes D3 and D4 and a single contactor K7. The cathodes of diodes D3 and D4 are connected to one side of contactor K7. The other side of contactor K7 is connected to the circuit node labeled c in FIG. 2a. The anode of diode D3 is connected to the circuit node labeled a in FIG. 2 and the anode of diode D4 is connected to the circuit node labeled b in FIG. 2a.

Figure 3:
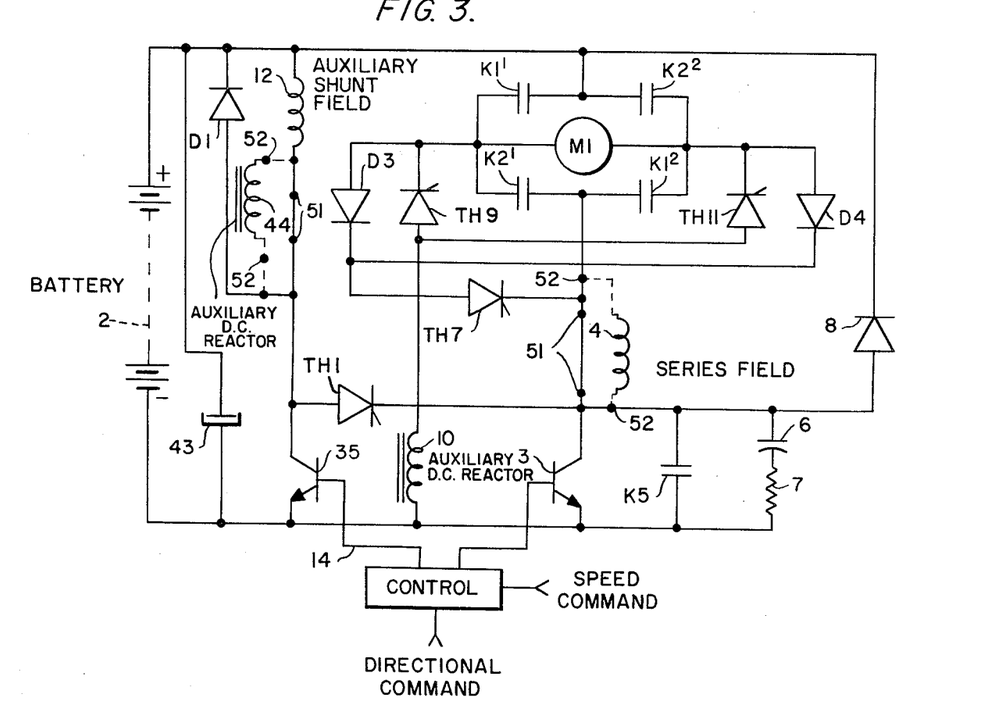

FIG. 3 shows another variation of the basic embodiment of FIG. 1. Again, in FIGS. 1, 2a and 3, like parts have like numerals. In FIG. 3, contactor K7 of FIG. 2a is replaced with a thyristor TH7 and diodes 9 and 11 are replaced with the thyristors TH9 and TH11. Another thyristor TH1 is added to the circuit. The anode of thyristor TH1 is connected to the collector of transistor 35, the anode of diode D1 and the lower end of shunt field 12 and its anode is connected to the circuit node labeled 66 and to the collector of transistor 3. In the propulsion mode, appropriate contactor pairs K1 or K2 are closed and thyristors TH9, TH11, TH7 and TH1 are in the "off" position. Motor speed and current is a function of the conduction duty cycle of transistor switch 3 and magnetic flux excitation of the shunt field is regulated by the transistor switch 35, and as described previously for the embodiments shown in FIGS. 1 and 2a.

When braking, the motor is driven by mechanical means and is now a generator. Contactor pairs K1 and K2 are disabled and open. At this point, and when the left hand side of the motor exhibits a positive voltage amplitude with respect to its right hand side, commensurate with forward motion, thyristors TH1, TH7 and TH11 are triggered into the forward conduction state while thyristor 9 remains in the non-conductive or "off" state. At this point energy recuperation is similar as described in FIG. 1. When transistor switch 3 is in the conduction mode, the motor generator supplies an exponentially rising current amplitude having a rate of rise proportional to motor generator voltage and magnetic flux excitation as provided by the shunt field. The current exits the left hand side of the motor 1 via diode D3 and thyristor TH7, transistor switch 3 and reactor 10; and enters the right hand side of machine 1 through thyristor 11. Diode D4 in the meanwhile is reverse biased because its cathode is at the potential of the left hand side of the generator. When transistor switch 3 is turned-off, the stored energy in reactor 10 and the armature of resistor 1 must be expended. Current continues to flow in the same direction but with decreasing amplitude, exiting reactor 10. The voltage on reactor 10 and the armature of motor 1 rises until its stored energy can exit via diode 8. Transistor 3 is continuously switched "on" and "off" in order to sustain continuous energy recuperation from the mechanical drive to the battery. By virtue of the thyristor TH1 being in the conducting state shunt field excitation is obtained. When coming out of the breaking mode, but just prior to returning into the propulsion mode, transistor 3 remains in the "off" condition. As the stored energy in reactor 10 is depleted diode 8 ceases to conduct, and thyristors TH7 and TH11 are commuted out by thyristor TH1. Commutation current is derived from a current path via shunt field 12 and reactor 10. After commutation of thyristors TH7 and TH11, transistor 35 is switched on to continue control of the shunt field. At that time contactor pair K1 or K2 can be closed to resume normal operation in the propulsion mode.

The circuit of FIG. 3 is also suitable for use with a motor having a DC series field 67 which would be connected to the circuit at the nodes 65 and 66 as indicated by the dotted lines. The solid line between nodes 75 and 76 would of course be removed. In order to maintain an independent control of the current amplitude of the undercompounded shunt field, it is necessary to insert a reactor 78 in series with shunt field 12 as indicated by dotted lines connected to nodes 75 and 76; the solid line across reactor 78 could, of course, be removed. Reactors 10 and 78 can be a single magnetic structure.

Figure 4:
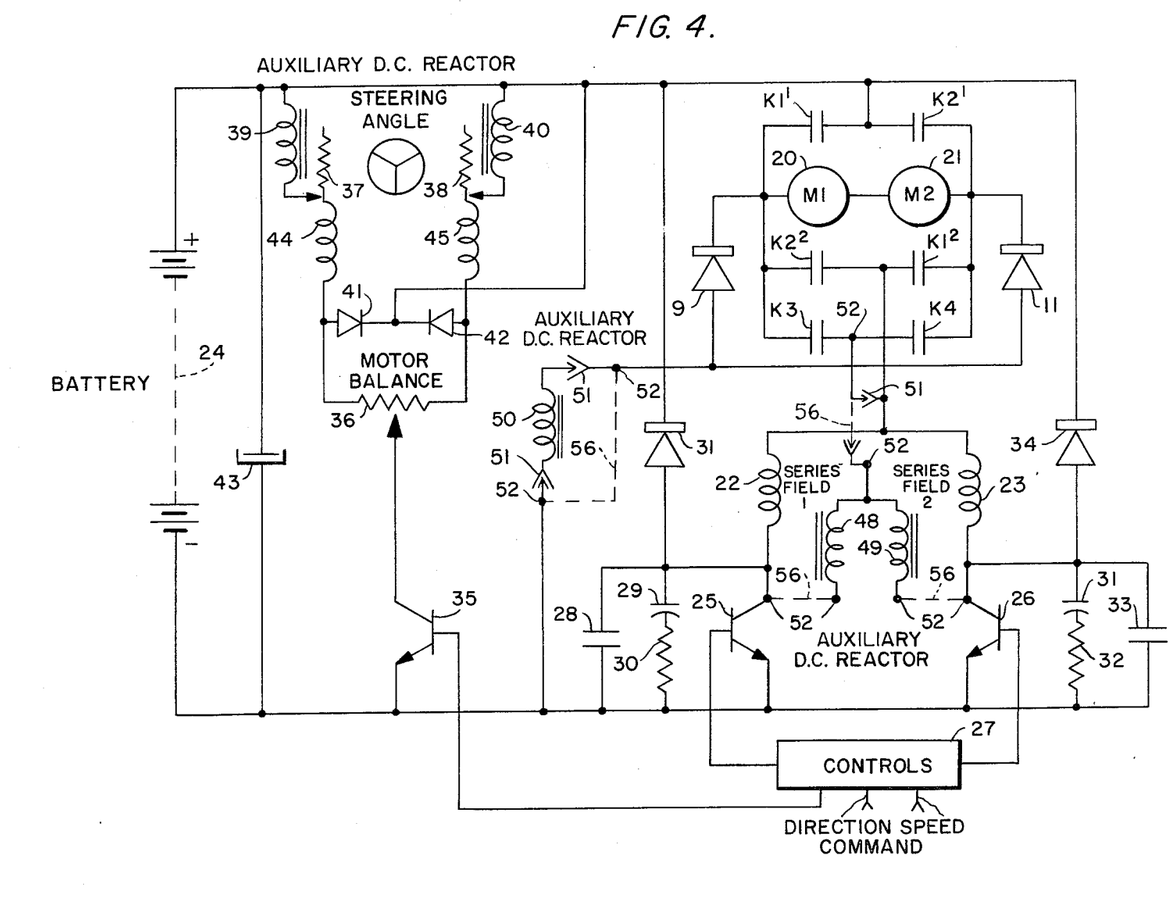
FIG. 4 is a schematic diagram illustrating the second basic embodiment of the invention.

The basic motor controller of FIG. 4 operates in a manner similar to the manner in which the basic motor controller of FIG. 1 operates. That is when the vehicle is operated in the forward mode contactors $K1^1$ and $K2^2$ are closed (all others open) and transistors switches 25 and 26 each are sequentially turned on and off to supply current pulses to motors 20 and 21 from battery 24. In the reverse mode of operation, contactors $K2^1$ and $K2^2$ are closed (all others open).

The contribution to prior state-of-the-art is that the controller utilizes two energy storing elements within the solid state controller, namely the reactors 22 and 23, and an energy storage capacitor across the battery terminals, the capacitor 43. Transistor switches 25 and 26 are alternately and in phase sequence turned on and off, such that transistor switch 25 is the forward conduction state between 0 and 2 radians, and transistor 26 between $\pi$ and 3 $\pi$ radians. It is self-evident that forward conduction provides in excess of $\pi$ radians duration will cause overlapping periods of conduction between devices 25 and 26. As is well known, the system is capable of providing instantaneous current transformation from the usually high voltage, lower current energy storage battery 24, to the lower voltage, high current sink comprised of the armatures of the motors 20 and 21. From prior literature it is readily understood that each sequentially switched transistor 25 and 26 will conduct typically only 50% of the instantaneous armature current, e.g.: at a forward conduction period $0 < t < \pi$ for either sequentially switched transistor 25 and 26 at a repetition frequency f, yields a DC current pulse duration of $0 < t < \pi$ at a repetition frequency $2f$ with an average peak current $I\phi K = \frac{1}{2} I$ (ARMATURE) motor 20, 21. When ever the conduction period of transistor switches 25 and 26 each exceed $\pi$ radians, the DC bus contains DC current whose magnitude is IPK=$\frac{1}{2}$ I (ARMATURE) motor 20, 21, whereby the duration is equal to the overlapping conduction interval between transistor switches 25 and 26, e.g.: $\pi < t < 2\pi$ or $0 < t < \pi$ at a repetition rate of $2f$. Since energy storage capacitor 43 alternatively stores or expends this energy, it follows that the battery current demand will be continuous DC current (with a slight ripple). To maintain energy balance, the magnitude of the current IBAT drained from the battery is:

$$I_{BAT} = \left[ \frac{(E \text{ ARMATURE } (20 + 21) + K1)}{E \text{ BATTERY}} \right] I (\text{ARMATURE})$$

whereby K1 is a constant which accounts for the average forward voltage drop in the solid state switches 25 and 26 and the effective voltage drop in the series fields.

In accordance with this invention, the basic motor controller of FIG. 4, as just described, is modified in the following manner: The shunt field 44 is added to motor 20 and the shunt field 45 is added to motor 21. Shunt fields 44 and 45 are electromagnetically coupled to series fields 22 and 23, respectively, and represent inductances with an initial current. Reactor 29 in series with the upper terminal of shunt field 44 and reactor 40 in series with the upper end of shunt field 45 provides regulation of the amplitude of the current in the shunt fields by virtue of the regulation of the conduction duty cycle of the transistor switch 60. The collector of transistor switch 60 is connected to the adjustable arm of the motor speed balance rheostat 36. One end of rheostat 36 is connected to the lower end of shunt field 44 and the other end of rheostat 36 is connected to the lower end of shunt field 45. The reactor 39 is coupled to rheostat 37 and the reactor 40 is coupled to the rheostat 38.

The adjustable arm of both rheostats 37 and 38 are coupled to the positive side of the battery 24.

It should be recognized that each motor armature of the essentially series field magnetically excited motors 20 and 21 is envisioned to provide motive power to independently driven wheels. As such it is necessary to provide speed synchronization for both machines, which when magnetically excited solely by the series fields 22 and 23 will run out of synchronism at light load profiles and/or low speed. Hence motor balance rheostat 36 provides an adjustable method to synchronize the speed between motors 20 and 21 at low speed, while the differential speed requirement between inner and outer wheel when negotiating a curve, can be controlled by steering angle control rheostats 37 and 38, while the level of average magnetic flux excitation contributed by the shunt fields 44 and 45 is controlled by the conduction-duty cycle of transistor switch 60. The contribution to the total flux level of motors 20 and 21 by virtue of shunt fields 44 and 45 is typically 10–20%.

The modified two phase, sequentially switched DC chopper motor controller, shown in FIG. 4, has been expanded to include means to recover motive energy when braking, to convert it into electrical energy, which is returned to storage battery 24. The means to recuperate this energy is manifested in the incorporation of diodes 46 and 47, contactors K3 and K4, and dual choice reactor(s) 48, 49 or 50. Diode 46 is coupled between the left-hand side of the armature of motor 20 as shown in FIG. 4 and the connection point 51 to be described later. Similarly, diode 47 is coupled between the right-hand side of the armature of motor 21 and connection 51. The manner in which auxiliary reactors 48, 49 and 50 are coupled into the circuit depends upon which of the two mode connections, to be described later, is utilized. The contactor K3 is coupled between the left-hand side of the armature motor 20 and a point in the circuit determined by which one of said two mode connections is utilized. Similarly, contactor K4 is connected between the right-hand side of the armature of motor 21 and a point in the circuit determined by which one of said two mode connections are utilized.

The first one of the two operational mode connections is indicated by the solid lines and the connection points labeled 51. The second operational mode connections are represented by the dashed lines and the connection points labelled 52. The circuitry is connected to only either one of these two operational mode connections.

In the first operational mode connection, diodes 46 and 47 are coupled to the top end of auxiliary inductance 50. The bottom end of auxiliary inductance 50 is coupled to the negative terminal of battery 24 and both contactors K3 and K4 are coupled to the top end of both series field windings 22 and 23. The auxiliary reactors 48 and 49 are not in the circuit.

In the second operational mode, diodes 46 and 47 are coupled to the negative terminal of battery 24. Reactor 50 is out of the circuit. In addition, the contactors K3 and K4 are connected to the top end of both of the auxiliary reactors 48 and 49 and the bottom end of auxiliary reactors, 48 and 49 are coupled to the bottom end of series field windings 22 and 23, respectively. The first operational mode represented by the solid lines and the connection points 51 is the preferred operational mode.

As was the case with the circuit of FIG. 1, when the accelerator pedal is released and/or the brake pedal is depressed either contactor K3 or K4 is closed, K3 for forward motion and K4 for reverse, with all other contactors open. Motive energy is recuperated, converted into electrical energy by the armatures of motors 20 and 21 and returned as charge current to battery 24. In the second operational mode, dashed line and connection points 52, motors 20 and 21 are solely exited by their respective shunt fields 44 and 45. Depression of the brake pedal increases shunt field excitation and the armatures of motors 20 and 21 transform vehicular motion energy into recuperable electric energy, subject to the conduction duty cycle of transistor switches 25 and 26. This recuperable electric energy is alternately stored and expended in auxiliary reactors 48 and 49 through diodes 31 and 34 and stored in battery 24. This requires rather large magnetic structures.

The preferred operational mode is the first mode respresented by the solid lines and the connection points 51, because in this mode constant flux excitation with the shunt fields can be obtained and the machine flux can be regulated regeneratively solely by the manipulation of the conduction period of transistor switches 25 and 26; thus, auxiliary reactor 50 comprises only a small magnetic structure. Its size is based on the desirable rate of rise of current in transistor switches 24 and 25. The shunt field excitation can be set to a fixed current value by sustaining a constant conduction duty cycle for transistor switch 60. For this condition the only variable is the conduction duty cycle of transistor switches 25 and 26, as manipulated by the brake pedal, and as such the instantaneous increase in magnetic flux excitation and energy storage in the series fields.

It is noteworthy that this circuit is capable of providing true instantaneous current transformation in its energy recovery operational mode from the usually high current, low-voltage generator source to the usually high voltage, low current energy storage battery. Since, the transistor switches modulate current in two separate energy storage elements, it follows that the sum of the average current amplitude in either transistor switch 25 and 26 is equal to the total current in the armatures 20 and 21. It follows that the pedestal of the current amplitude in the DC bus is equal to 50% of the current amplitude in the armatures 20 and 21, whereby the pulse repetition rate is two times that of the individual transistor switches 25 or 26. The current pulse train in the DC bus is then smoothed by energy storage capacitor filter 43, such that the battery is solely charged with transformed recuperated energy whereby the instantaneous charge current amplitude can be approximated with:

$$I\,BAT = I\,ARM\left[\frac{(E\,ARM - K)}{E\,BAT}\right]$$

whereby:
I ARM = ARMATURE CURRENT
I BAT = BATTERY CHARGE CURRENT
E ARM = ARMATURE VOLTAGE FOR BOTH MACHINES
E BAT = BATTERY VOLTAGE
K BAT = Constant which accounts for lines in controller, cables, etc.

Thus the two phase, sequentially switched chopper by virtue of its 3 discrete energy storage elements 22, 23, 43, or 48, 49 and 43 is capable of providing true instantaneous current transformation, while the conventional industrial chopper returns current pulses for the battery where amplitude equals that of the generator 1 at considerably higher resistive voltage drop across the equivalent series resistance within the battery. Hence, the two phase, sequentially switched chopper of this invention is capable of recuperating energy more efficiently at lower heat loss than the industrial chopper shown in FIGS. 1 through 3, while the basic two phase, sequentially switched motor controller has no provisions for recuperation.

Figure 5:
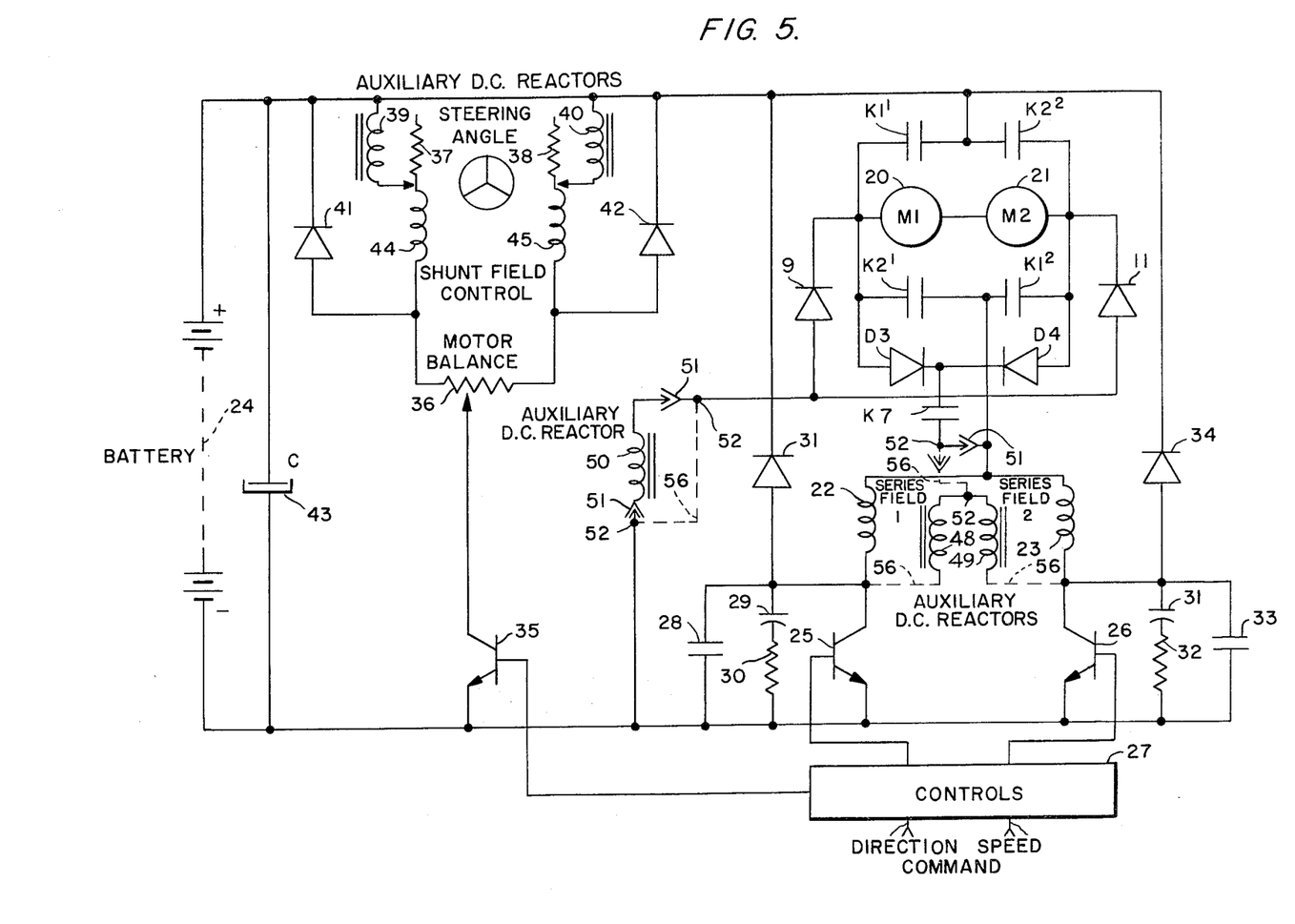
FIG. 5 is a schematic diagram illustrating a variation of the second basic embodiment of FIG. 4.

The circuit of FIG. 5 shows the replacement of contactors or rotary switch K3 and K4 shown in FIG. 4 by a dual diode matrix D53 and D54 and a single contactor K34 similarly as shown in FIG. 2b. Recuperation of energy is essentially unchanged from the circuit described in FIG. 4 and FIG. 2b.

Figure 6:
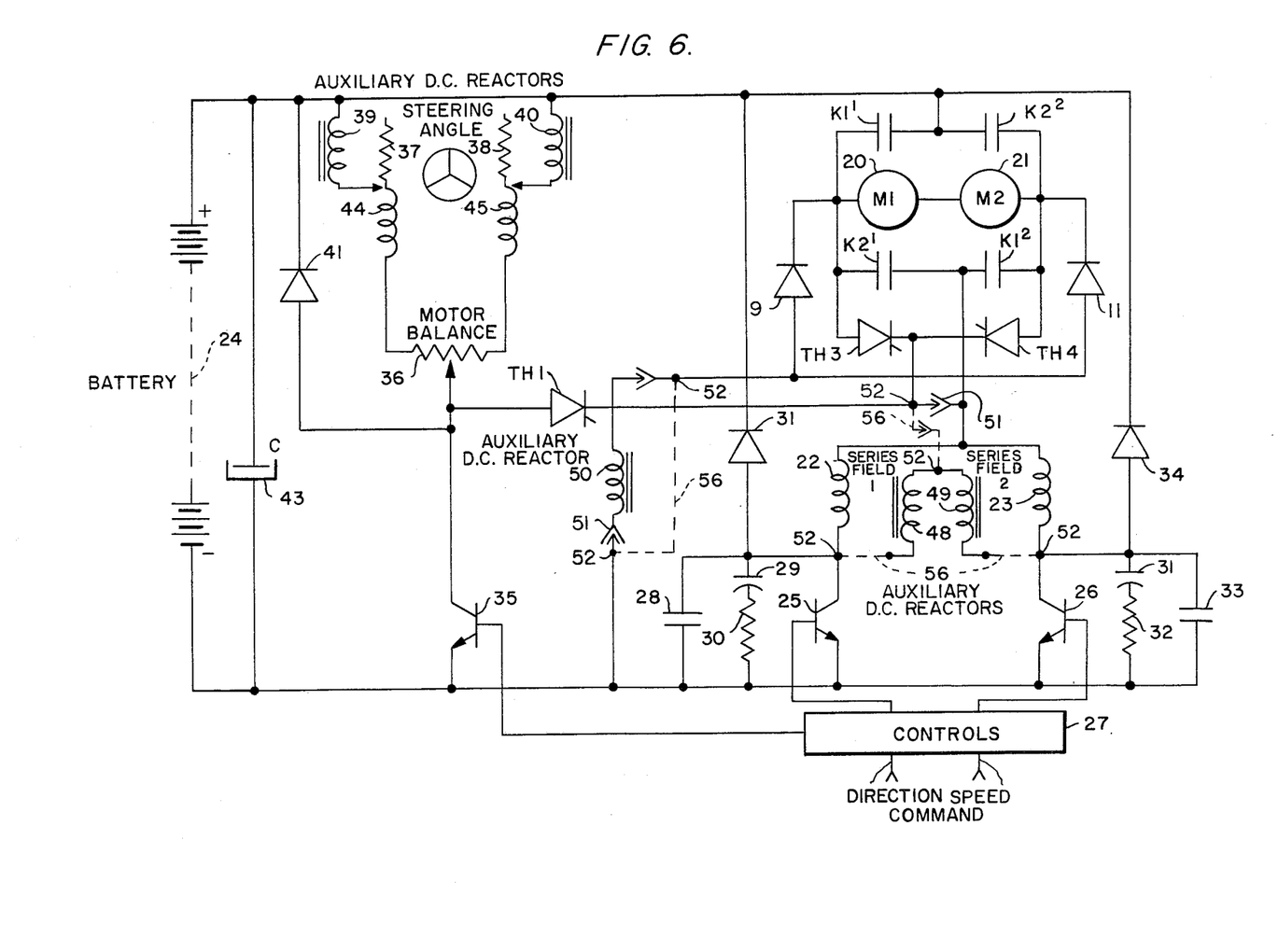
FIG. 6 is a schematic diagram illustrating still another variation of the second basic embodiment.

FIG. 6 shows the circuit schematic which manifests recuperation of energy solely by virtue of solid state switching components. Contactor K3 is replaced by thyristor TH55 and contactor K4 is replaced by thyristor 56. The cathodes of both thyristors TH55 and TH56 are interconnected with either circuit node 51 or 52 as desired. The anode of thyristor TH57 is connected to the collector of transistor switch 60, and its cathode is connected to either the circuit node 51 or 52, as desired. During the motoring propulsion mode all thyristors are "off", and there is no change in circuit operation from the circuit of FIG. 4. In the energy recuperation mode, however thyristor TH57 preferably will be continuously triggered into the forward conduction state jointly together with TH55 for the recuperative brake mode in the forward direction, and TH56 for the recuperative brake mode in the reverse direction. It should be understood, however, that the control of shunt field excitation by virtue of the control of the conduction duty cycle of transistor switches 25 and 26 is minimal at best, and that the current amplitude for the shunt field must still be regulated by transistor switch 60. However, when returning from the recuperative brake mode into the propulsion mode, transistor switches 25, 26 and 60 are temporarily turned off into the non-conduction state. After decay of the energy stored in series-fields 22, 23 and reactors 50 or 48–49, thyristor TH55 or TH56 will be reverse biased and commutated out by virtue of current flowing from the positive DC bus, shunt fields 44/45, TH57 in the forward direction, TH55 or TH56 and diode 47 or 46 in the reverse direction to the negative battery bus. After commutation of the TH55 or TH56 transistor 60 is switched on again to commutate TH57 at the time contactor pair K1 or K2 is activated.

From the foregoing description of the invention, it is apparent that the circuitry of this invention provides a means for recovering electric energy in an electric vehicle. Therefore, this invention provides for greater driving range between battery recharges than is provided with the electric vehicles that do not have any means for recovering electrical energy.

While the invention has been described with reference to two specific embodiments, and variations thereof, it will be obvious to those skilled in the art that various changes and modifications can be made to these two embodiments and each variation thereof without departing from the spirit and scope of the invention as set forth in the claims.

What is claimed is:

1. An electrical drive vehicle with onboard battery energized DC motor drive to at least one wheel of the vehicle wherein; said DC motor has a primary series field winding and an auxiliary shunt field winding, said shunt field winding disposed in electromagnetic coupled relation to said series field winding; said series field winding being energized by the onboard battery when said vehicle is electrically driven; said DC motor including motor controller means with unidirectional conduction means and switching means to change said DC motor from a series field operational mode to a shunt field operational mode during braking of the vehicle such that said DC motor, operational as a shunt field machine, supplies electrical energy, derived from braking motion kinetic energy, to said onboard battery;

wherein said motor controller means includes an intermediate electrical energy storage means electrically connected between said DC motor and said onboard battery such that (1) conversion of motion kinetic energy to electrical energy with storage of such electrical energy, and (2) the supply of electrical energy to the onboard battery, may occur in successive order;

wherein said switching means is a transistor switching means having a variable conduction duty cycle adapted to control the magnitude of magnetic flux excitation of the DC motor when operating in the shunt field operational mode and thereby the magnitude of electrical energy converted from braking motion kinetic energy, and means for controlling the conduction duty cycle time interval such that conversation of electrical energy from braking motion kinetic energy occurs for a determined time interval;

and wherein said transistor switching means is switched from series to shunt by the operator during the braking of said vehicle.

2. The electrical drive vehicle as defined in claim 1 wherein said motor controller means further includes a transistor switching means having an emitter coupled to one selected terminal of the onboard battery, a base coupled to vehicle controls and a collector coupled to one end of the series field winding;

first means including said transistor switching means for supplying current pulses to said DC motor from said onboard battery to propel said vehicle in a forward direction;

second means including said transistor switching means for supplying current pulses from said onboard battery to said DC motor to propel said vehicle in a reverse direction;

a diode coupled between the other terminal of the onboard battery and said collector of said transistor;

an inductance having a first terminal and a second terminal, said first terminal of said inductance being coupled to said emitter coupled terminal of said battery and said second terminal of said inductance being coupled to one side of said armature of said motor through a first diode and to the other side of said armature through a second diode.

3. The electrical vehicle as defined in claim 2 wherein said means for recovering electrical energy and applying said recovered electrical energy to said battery further includes a first contactor for recovering electrical energy when said vehicle is propelled in a forward direction and a second contactor for recovering electrical energy when said vehicle is being propelled in a reverse direction, said first contactor being coupled between said one side of said armature and said collector of said transistor and said second contactor being coupled between said other side of said armature and said collector of said transistor.

4. The electrical vehicle as defined in claim 1 wherein said motor controller means further includes a first contactor for recovering electrical energy when said vehicle is propelled in a forward direction and second contactor for recovering electrical energy when said vehicle is being propelled in a reverse direction, said first contactor being coupled between said one side of said armature and the end of said series field winding opposite the end to said series field winding that is coupled to said collector of said transistor and said second contactor being coupled between said other side of said armature and the end of said series field winding that is opposite the end of said series field winding that is coupled to said collector of said transistor.

* * * * *